June 11, 1935. I. V. BRUMBAUGH 2,004,567
COMBINATIONS OF ENAMEL AND SPRAYED METAL
Filed Sept. 8, 1933 2 Sheets-Sheet 1
FIG. I
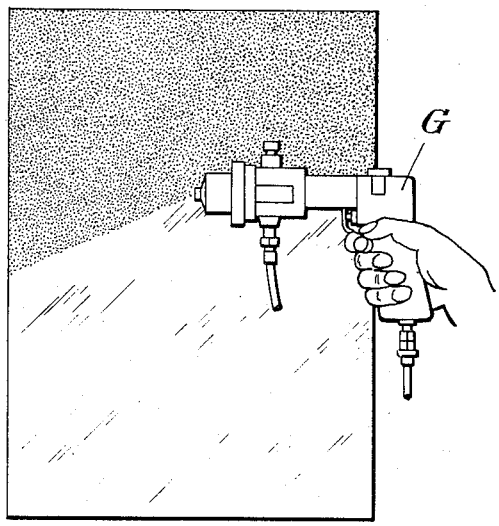
FIG. II
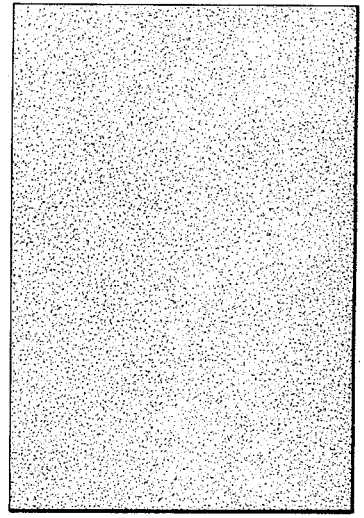
FIG. III
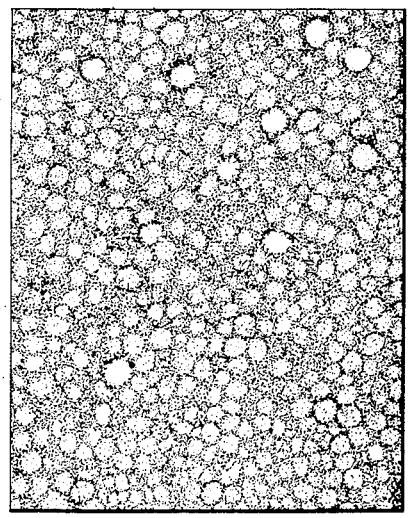
FIG. IV
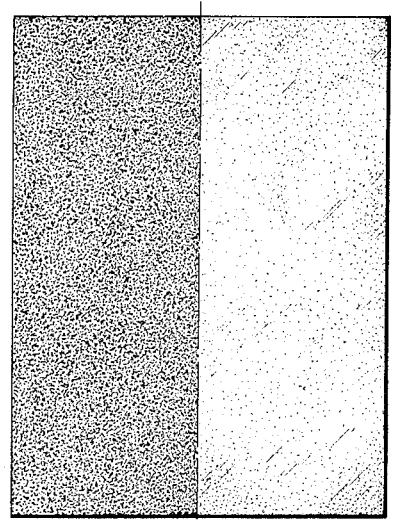
WITNESSES:
Hubert Fuchs
William Bell, Jr.
INVENTOR:
Isaac V. Brumbaugh,
BY Bakewell Paul
ATTORNEYS.

June 11, 1935.  I. V. BRUMBAUGH  2,004,567
COMBINATIONS OF ENAMEL AND SPRAYED METAL
Filed Sept. 8, 1933  2 Sheets-Sheet 2
FIG_V_
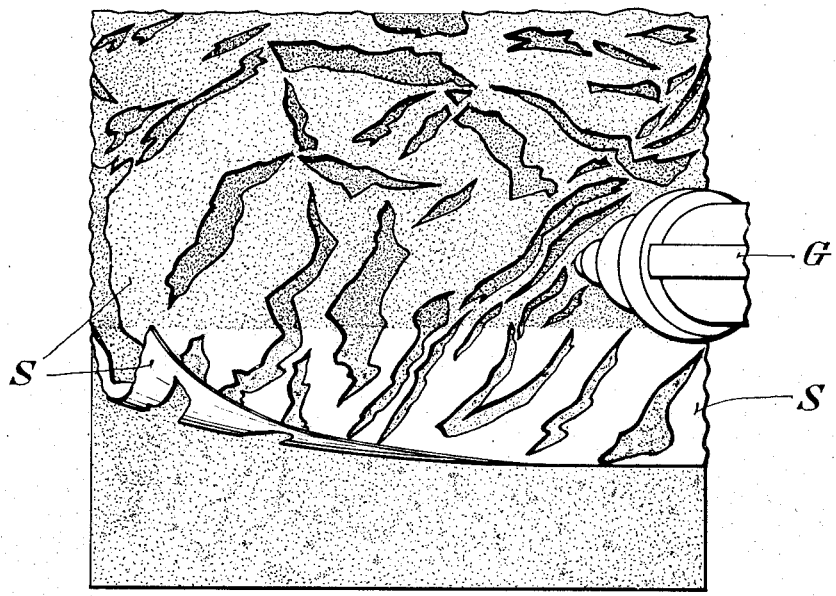
FIG_VI_
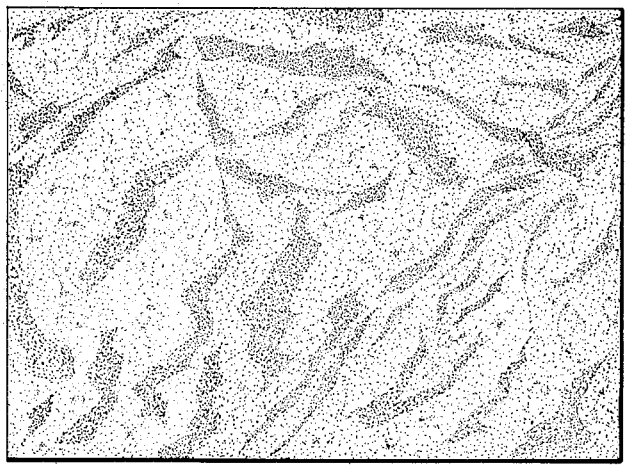
WITNESSES:
INVENTOR:
Isaac V. Brumbaugh,
BY
ATTORNEYS.

Patented June 11, 1935

2,004,567

UNITED STATES PATENT OFFICE 2,004,567

COMBINATIONS OF ENAMEL AND SPRAYED METAL

Isaac V. Brumbaugh, St. Louis, Mo.

Application September 8, 1933, Serial No. 688,624

26 Claims. (Cl. 41—36)

This invention relates to the application of sprayed metal and the like in connection with ceramic and vitreous materials and the like, including enamels and glazes, and to ornamental, decorative, and like effects produced by such decorative sprayings or sprinklings of metal particles, when suitably combined with the ceramic or vitreous surface. The invention is especially advantageous for decorating enamel on metal, and I have hereinafter explained it particularly with reference to this use. However, the invention is applicable to ceramic and vitreous materials and articles generally,—including objects of, or coated with clay, china, porcelain, glass, and vitreous materials, and particularly plate glass, as well as glazed or enamel-coated objects of metal or other materials. Various other features and advantages of the invention will appear from the following description of species thereof.

In the enamelling of metal as commonly practiced, a ground coat of suitable enamel material is applied to the article, utensil, or surface to be enameled, and the latter is put into a suitable oven or furnace to fuse the enamel material, producing a firmly adhered glaze of fused enamel on the surface or article. Then a cover coat of enamel material adapted to give the desired final color and texture is applied over the ground coat, and the article is again heated or fired to a sufficient temperature to fuse this cover coat to the ground coat and to the article, as a firmly adherent glaze or enamel.

In the practice of my invention in connection with enamelled or glazed surfaces, I spray decorative material, particularly metal, on the enameled surface or article, and thereafter heat the thus metal-sprayed enamel sufficiently to incorporate the sprinkling of sprayed metal particles into the enamel. Such heating, apparently, often causes solution of the sprayed metal (or its oxide) in the enamel, i. e., more especially, in the fluxes of the enamel. The metal spraying may be done after application of the cover coat, but before it has been heated and fused; and the sprayed metal may thus be incorporated in the enamel by the same heating that unites the cover coat with the ground coat, simultaneously. Or the metal spraying may be done after the usual heating and fusion of the cover coat,—in which case, a special heating operation will be needed to incorporate the metal into the enamel. Contrary to natural expectation from experience in spraying metal on smooth, glossy surfaces, I have found that sprayed metal will adhere to surfaces of previously fused enamel when they are really free of grease. In either case, the best effects are generally obtained by adjusting the spray-gun to produce a fairly fine spray of metal; for if the spray is more or less coarse, the larger discrete particles or lumps of metal besprinkling the surface do not fuse into the enamel properly when the enamel is afterward fused, as fine discrete metal particles do. Likewise, best effects are often obtained with a fairly light spraying or "flash" of metal, in such quantity as to leave the original enamel color perceptible amongst the discrete sprayed particles thus more lightly sprinkled over it, after heating of the enamel to fusion. It is generally important to avoid contamination of the enameled surface with grease, especially when spraying on enamel that has previously been fused; for even the grease or oil ordinarily on the human hand causes poor adhesion of the metal spray to a previously fused enamel surface. Hence enamel surfaces that have been handled may have to be cleaned with a grease solvent before spraying with metal.

The effects produced may be somewhat more even when the metal is sprayed on unfused enamel than when it is sprayed on previously fused enamel, since in the former case the discrete metal particles are partially embedded into the unfused enamel material at the outlet. Also, the color effects may be somewhat different in these two cases: e. g., when copper is sprayed on previously fused ivory enamel, and the latter afterward heated to fusion, the copper appears against the ivory ground as a green and black (or very dark green) speckled or "pepper and salt" effect, indicating that the copper particles have practically all been oxidized to CuO in the heating before becoming incorporated in the enamel, or have undergone some chemical reaction yielding green; while when the copper is sprayed on previously unfused ivory enamel, there is a pepper and salt effect of red and green particles against the ivory ground, suggesting that many of the copper particles have become covered with fused enamel quickly enough to be protected from oxidation or other reaction, or have only been oxidized to $Cu_2O$. A combined spray of copper and nickel on previously unfused ivory enamel gives a red and grey pepper and salt effect.

The invention can be applied, of course, in connection with enamel of any desired color or colors.

Pleasing variations of effect can also be obtained by the use of special auxiliary enamels or extra glazes. For example, by spraying copper on previously fused enamel and applying a crackle material (unfused) a pitted irregular distribution of the dark green due to the copper is obtained when the article is subsequently heated to fuse the enamel, and the crackle thereby also fused and united to the enamel; i. e., the crackle controls the distribution of the metal. By spraying copper on previously unfused ivory enamel, then applying lusterlite cleargloss glaze on top of this, and fusing the enamel and the glaze, a whitish effect with undertones of red and green salt and pepper particles is obtained, or even a mauve undertone.

Pleasing effects can also be obtained by spraying the metal through stencils designed to give a veined appearance like that of marble. For this purpose, the enamel surface may first be lightly sprayed with metal without a stencil, to afford a background, and then sprayed through a marble stencil,—all before firing the article to incorporate the sprayed metal in the enamel. In this case, either the same metal or different metals may be used for the two sprayings. Other stencils besides marbling may be used, including any more or less regular pattern, or lettering stencils. If the stencil is held a short distance from the enamel surface during the spraying, particles of metal will work under the stencil edges and give a pleasing softness of outline or blending.

When a resist is desired, a combustible material such as paraffine can be applied, before spraying, to the areas which it is desired to leave untouched by the sprayed metal: it will burn off at a low temperature, during the heating to fuse the enamel, and the metal adhering to the combustible material will disappear with it, while that in the uncoated areas will be interfused into the enamel or glaze, as in other cases.

As already intimated, it appears that most metals oxidize in the heating to incorporate them into the enamel, owing to their fine state of division and the intense heat to which they are subjected. Accordingly, the heating usually gives the enamel such color(s) as characterize the metal involved when its oxide is dissolved in enamel: e. g., iron gives brown; copper gives black, dark green, light green, or red, etc. Silver, on the other hand, gives a delicate lustrous buff tone, and nickel a grey. In general, metals of the groups of the periodic system which include iron, copper (and its alloys, like brass), nickel, and silver are especially suitable for my purpose.

In applying the invention to objects or articles of glass, especially, the spraying may in some cases be done while the newly-made or treated article is hot and in a state bordering on fusion, or superficially fused, from the preceding processes or operations of manufacture, or treatment: i. e., while the material still remains sufficiently hot to fuse the sprayed metal into its surface. Thus a special heating operation may sometimes be avoided in such cases.

In the case of clay, lime, or porcelain articles and surfaces, the spraying may be done after they are formed (and dried), but before they are fired; or if they are glazed, or are fired more than once for any other reason, then the spraying may be done at any stage before the last firing in the normal process of manufacture. Or, again, even when glazed, they may in some cases be sprayed during or following the final heat, while they are still hot enough for interfusion of the glaze with the sprayed metal,—and a special heating step may thus be avoided.

In the drawings, Fig. I is an elevation illustrating the operation of spraying or sprinkling an object or base with metal particles for the purposes of my invention.

Fig. II is a similar view of the object or ceramic surface after the completion of the spraying and the incorporation of the sprinkling of metal particles into the ceramic or vitreous surface of the base by fusion.

Fig. III is a view of a ceramic surface with a sprinkling of metal particles and a coating of crackle material applied and fused thereon.

Fig. IV is a view of a ceramic surface with a sprinkling of metal particles thereon, and a coating of lusterlite clear glaze applied and fused on half of it.

Fig. V illustrates the production of a marble effect by lightly sprinkling a ceramic surface with metal particles, and then additionally spraying it with such particles through a stencil.

Fig. VI shows the product of the operation illustrated in Fig. V, after completion of the second spraying and subsequent fusion of the ceramic surface.

Figs. I-VI illustrate the practice and results of my invention in the treatment of enamelled metal. Except as otherwise mentioned, the metal spraying has been done in each case after application of the cover coat, but before heating and fusion thereof.

In Fig. I the operation of metal spraying with the usual spray-gun G is illustrated. The upper part of the surface is shown covered with a sprinkling of discrete fine metal particles, amongst which the enamel cover-coat is perceptible; and the lower part of the surface is shown unsprayed. Fig. II shows the same surface after completion of the spraying and fusion of the cover coat,—the metal particles still appearing as discrete and separate. The speckled or pepper and salt effect shown corresponds to that of copper sprayed on an ivory enamel cover-coat,— though in black and white the actual color effects naturally cannot be adequately rendered. The softness due to oxidation of the copper particles and fusion of the oxide with the enamel is indicated by the greater fineness of the dots representing the copper particles in Fig. II, as compared with those in Fig. I.

In Fig. III the effect of spraying copper on a previously fused enamel cover coat, then applying a crackle (unfused), and then fusing the crackle is shown. The pitted appearance is due to the effect of the fused crackle on the distribution of the sprinkling of copper particles,—which, however, still remain discrete.

The left-hand half of Fig. IV shows a sprinkling of copper particles on (ivory) enamel as produced by the spray-gun, very much as in Fig. I; the right-hand half shows the effect of applying lusterlite cleargloss glaze on top of such a sprayed surface, and then heating and fusing the enamel and the glaze. It will be observed that the discrete copper particles are much less prominent, being to a certain extent "masked" by the glaze.

Fig. V shows an enamel surface lightly sprinkled all over with metal particles, with a marble stencil S over its upper portion, and a spray gun G spraying it with an additional sprinkling of metal particles through the stencil. Fig. VI shows the effect after completion of the stencil spraying and the subsequent firing. In both Figs. V and VI, the metal particles remain discrete in all areas, but are naturally more numerous in the areas that have received the additional sprinkling through the stencil. The effect in Fig. VI is softer than in Fig. V, owing to the interfusion of the metal particles into the fused enamel.

Having thus described my invention, I claim:

1. A process of interfusing a sprinkling of discrete metal particles on a surface of ceramic material into the ceramic surface by fusion of the latter.

2. A process of concurrently uniting applied ceramic material and a sprinkling of discrete metal particles to an underlying object or base by fusion of the ceramic material.

3. A process which comprises applying ceramic material and a sprinkling of discrete metal particles on an object or base, and concurrently interfusing the metal particles into the ceramic material and fusing the latter to the base.

4. An art of producing decorative and the like effects on ceramic and vitreous materials which comprises besprinkling a surface of such material with a sprinkling of discrete metal particles, and heating the surface and thereby incorporating the metal particles into it.

5. A process which comprises besprinkling a ceramic surface or base with a sprinkling of discrete metal particles, subsequently applying ceramic material thereto, and fusing the applied ceramic material to the ceramic surface and thereby incorporating the sprinkling of metal particles into the ceramic material.

6. A process of heating a surface of ceramic material with a sprinkling of discrete oxidizable metal particles, and thereby oxidizing and interfusing the metal particles into the ceramic surface.

7. A process which comprises applying ceramic material and a sprinkling of discrete oxidizable metal particles on an object or base, and heating them and thereby oxidizing the particles and interfusing them into the ceramic material, and fusing the latter to the base.

8. An art of producing decorative and the like effects on ceramic and vitreous materials which comprises besprinkling a surface of such material with a sprinkling of discrete oxidizable metal particles; and heating the surface and its sprinkling of metal particles, and thereby oxidizing and interfusing the particles with the ceramic or vitreous material.

9. An art of producing decorative and the like effects on ceramic and vitreous materials, which comprises spraying a surface of such material with a sprinkling of discrete metal particles, and heating the surface and thereby incorporating the sprayed metal particles into it.

10. A method of producing decorative and the like effects on ceramic materials which comprises spraying a flash of discrete metal particles on a surface of such material, and heating the surface and thereby incorporating the sprayed metal particles into it.

11. An art of producing decorative and the like effects on ceramic or vitreous enamel, which comprises spraying a sprinkling of discrete metal particles on an unfused enamel surface, and heating and fusing the enamel to its base and the sprayed metal particles into the enamel.

12. An art of producing decorative and the like effects on ceramic or vitreous enamel, which comprises spraying a sprinkling of discrete metal particles on an enamel surface, and heating the thus sprayed enamel sufficiently to cause solution of the metal particles in the enamel.

13. A method of producing decorative and the like enamel effects which comprises applying enamel to the surface where the effect is to be produced, spraying a sprinkling of discrete metal particles thereon, and simultaneously fusing the enamel to the surface and the sprayed metal particles into the enamel.

14. An art of producing decorative and the like effects on ceramic or vitreous enamel, which comprises lightly spraying an enamel surface with a fine metal spray, leaving the enamel perceptible amongst the resultant sprinkling of discrete metal particles, and heating the enamel to fusion and thereby incorporating the sprayed metal particles in it.

15. An art of producing decorative and the like effects on ceramic or vitreous enamel, which comprises spraying an enamel surface with a sprinkling of discrete metal particles, applying an extra glaze material, and heating the enamel to fusion and thereby incorporating the sprayed metal particles therein and in the extra glaze, and also uniting the latter to the enamel.

16. A method of producing decorative and the like effects on ceramic and vitreous materials which comprises freeing the surface of such material of grease, spraying a sprinkling of discrete particles of decorative material thereon, and heating the surface and thereby interfusing the decorative particles thereinto.

17. A method of producing decorative and the like effects on ceramic and vitreous materials which comprises spraying a surface of such material with metal while the material is sufficiently hot to fuse the sprayed metal into it.

18. A method of producing decorative and the like effects on ceramic and vitreous materials which comprises coating portions of a surface of such material with a combustible resist, spraying a sprinkling of discrete particles of decorative material on both coated and uncoated areas, and heating the surface and thereby removing the resist coating and the decorative material thereon, and interfusing the rest of the decorative particles into the ceramic or vitreous material at the uncoated areas.

19. A method of producing decorative and the like effects on ceramic and vitreous materials which comprises spraying a sprinkling of discrete metal particles on a surface of such material through a stencil, and heating the surface and thereby incorporating the sprayed metal particles into it.

20. A method of producing decorative and the like effects on ceramic and vitreous materials which comprises spraying a sprinkling of discrete particles of decorative material on a surface of such material through a stencil close thereto but spaced slightly therefrom, and heating the surface and thereby incorporating the decorative particles into it.

21. An article of manufacture having a ceramic or vitreous surface with a sprinkling of metal particles fused and incorporated thereinto.

22. An article of manufacture having a ceramic or vitreous surface with a sprinkling of metal particles of the groups which include iron, copper, brass, nickel, and silver fused and incorporated thereinto.

23. An article of manufacture having a ceramic or vitreous surface with a sprinkling of oxidized metal particles interfused therein.

24. A manufacture of enamel with a sprinkling of metal particles fused and incorporated thereinto.

25. A manufacture of enamel with a sprinkling of fine particles of metal fused and incorporated thereinto in such amount as to leave the original color of the enamel perceptible amongst the sprayed particles.

26. A manufacture of enamel with an extra glaze fused thereto, and with a sprinkling of metal particles fused and incorporated into the enamel and the glaze, and controlled in their distribution by the glaze.

ISAAC V. BRUMBAUGH.